No. 836,596. PATENTED NOV. 20, 1906.
T. MAHONEY.
CAMERA.
APPLICATION FILED JULY 19, 1904. RENEWED AUG. 4, 1906.
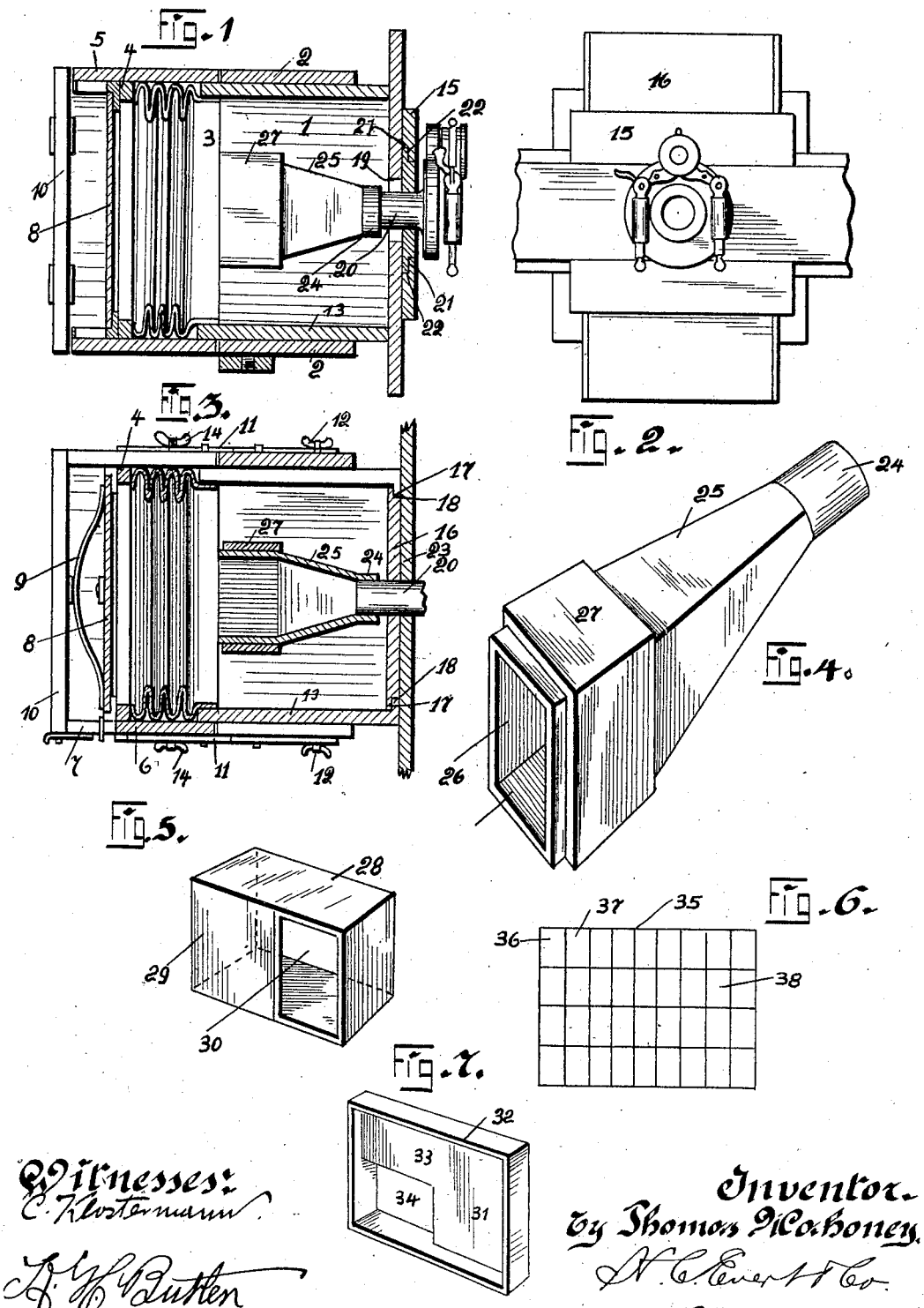
Witnesses:
Inventor
Thomas Mahoney
Attorneys.

UNITED STATES PATENT OFFICE.

THOMAS MAHONEY, OF PITTSBURG, PENNSYLVANIA.

CAMERA.

No. 836,596.           Specification of Letters Patent.           Patented Nov. 20, 1906.

Application filed July 19, 1904. Renewed August 4, 1906. Serial No. 329,264.

*To all whom it may concern:*

Be it known that I, THOMAS MAHONEY, a citizen of the United States of America, residing at Pittsburg, in the county of Allegheny and State of Pennsylvania, have invented certain new and useful Improvements in Cameras, of which the following is a specification, reference being had therein to the accompanying drawings.

This invention has relation to camera attachments, and has for its object the provision of novel means whereby a single sensitized photographic plate or film may be successively exposed to the same or different subjects, producing a plate or film upon which a series of distinct and separate negatives will be produced.

Another object of my invention is to provide an attachment of the above-described character which will enable a variety of subjects, poses, or positions of a single subject to be presented on a picture or produced by a single printing operation from the negative, and in connection with the attachment I employ a novel expedient whereby the attachment may be adjusted to the adjustment of the camera and may also be adjusted independently of the camera to produce a series of negatives of an equal dimension or to symmetrically arrange or group the negatives on a plate or film.

Briefly described, my improved attachment consists of a funnel the larger end of which is rectangular in cross-section, and upon this end is provided a slide to enable the funnel to be lengthened, and upon the other end of said funnel is formed a collar which is adapted to be connected to the rear ends of the lens-holder, and in connection with said funnel I employ hoods for obtaining negatives of a smaller size than could be obtained from the funnel.

The above construction will be hereinafter more fully described, and specifically pointed out in the claims, and, referring to the drawings accompanying this application, like numerals of reference indicate similar parts throughout the several views, in which—

Figure 1 is a vertical sectional view of a camera, showing my improved attachment applied thereto. Fig. 2 is a front view of the same. Fig. 3 is a horizontal sectional view of a camera, showing my improved attachment in position thereon. Fig. 4 is a perspective view of my improved attachment. Fig. 5 is a perspective view of a hood which may be employed in connection with the attachment. Fig. 6 is a diagrammatic view of a plate, illustrating a plurality of pictures thereon; and Fig. 7 is a perspective view of an auxiliary hood.

To put my invention into practice, my improved attachment can be used and employed upon the ordinary form of camera, and in the accompanying drawings I have illustrated a preferable form upon which the attachment can be readily used. The camera consists of a rectangular casing or box 1, surrounding which is a rectangular frame 2, and secured to the rear end of the casing 1 is a bellows 3, this bellows being connected to a rectangular framework 4, carried in an adjustable rectangular frame 5, which is mounted upon the rear end of the casing 1. The side 6 of the frame 5 is cut away, as indicated at 7, to premit of the insertion of the plate-holders (not shown) within the camera and also to allow a focusing-plate 8 to be mounted therein, this plate being held in engagement with the plate-holders or rectangular frame 4 by a spring 9, which engages a hinged door 10. The frame 5 is adjusted upon the casing 1 by the metallic strips 11 11, these strips being secured to the frame 2 by thumb-screws 12 12, and are provided with slots through which the thumb-screws 14 14 pass, whereby the frame 5 may be angularly adjusted in relation to the frame 2 and the casing 1 or may be moved rearwardly to permit the desired focusing of the object or plate upon the focusing-plate 8. This construction just described is well known to those skilled in the art of photography, and I will now describe the particular features of the camera in which my invention resides.

In the front end 15 of the casing 1 I adjustably mount a front board 16, which is provided with flanges 17 17, that are adapted to engage the flanged edges 18 18 of the front end 15 of the camera, this front board being adapted to slide vertically within the camera, and I form therein horizontally a slot 19, through which the sleeve end 20 of the lens-holder is adapted to protrude. In the front end 15 of the camera I also form the horizontal grooves 21 21, in which are adapted to slide the flanges 22 22 of the lens-holding board 23. The lens-holder is of the ordinary and well-known type and may carry an automatic shutter of the rotary character.

In Fig. 4 of the drawings I have illustrated my improved attachment, which conforms to the shape of a funnel, and the funnel is adapted to be secured upon the protruding end of the sleeve 20 of the lens-holder. The reference-numeral 24 indicates an annular collar, which is formed integral with the tapering sides 25 of the funnel, these sides terminating in horizontal alinement with each other, as indicated by the reference-numeral 26, and upon the sides of this end of the funnel I mount an adjustable slide or sleeve 27. By observing the different views of the drawings it will be seen that the end of the funnel is preferably rectangular in cross-section, this particular shape being employed to provide means whereby two different shapes of pictures may be projected upon the negative plate or film, it only being necessary to revolve the funnel upon the end of the sleeve 20 a quarter of a revolution to obtain a shape the longer sides of which will be horizontal to that of the sides when the same is in the vertical position—that is, a vertically-oblong shape may be obtained and a horizontally-oblong shape may be obtained by simply rotating the funnel upon the sleeve.

In Figs. 5 and 7 of the drawings I have illustrated two forms of hoods which may be employed in connection with the funnel for producing pictures of smaller dimensions than those projected from the funnel comprising my improved attachment. The hood 28 is adapted to fit over the rectangular end of the funnel, and the closed end 29 of the hood is cut away, as indicated at 30, whereby an object or subject that is to be reproduced upon the sensitized negative will be of one-half the size of the pictures that would have been reproduced had not the hood been used, and in Fig. 7 of the drawings a form of hood is shown which is employed for reproducing pictures of a quarter the size that the funnel would produce. The hood, as indicated by the reference-numeral 31, is formed by a frame 32, which is adapted to fit over the end of the funnel, this frame having a partition 33 formed therein, the one corner of which is cut away, as indicated at 34, the cut-away portion being of the same size as one-quarter of the frame 32.

The manner of using my improved attachment is as follows: To produce a plurality of pictures upon a sensitized plate, it is necessary that the lens-holder and funnel be raised to its highest position within the camera, this being accomplished by raising the front board 16 and adjusting the lens-holding board 23 to such a position that the funnel will be upon one side of the camera, at which time a picture can be exposed to the sensitized plate, and to further illustrate this I have represented in Fig. 6 of the drawings a plate 35, the reference-numeral 36 indicating the shape and position of a picture which I have just described as being exposed to the sensitive negative. Upon this picture being exposed it is only necessary to move the lens-holding board 23 to the right and again operate the shutter to expose a picture upon the negative-plate, the reference-numeral 37 indicating the second picture to be produced upon the plate. This operation may be continued until a horizontal row of negatives have been produced upon the negative-plate, at which time the front board 16 is lowered to allow the funnel to project another horizontal row of pictures 38 beneath the row just obtained, and this operation is continued until the negative-plate has been filled with reproductions of the object or subject that has been exposed, each reproduction upon the negative-plate being of the same dimensions and shape and of a distinct and separate exposure. It will thus be seen from the adjusting mechanism of the camera and my improved attachment that the pictures may be artistically and symmetrically arranged upon the plate and that different-shaped pictures may be produced.

The hoods, as illustrated in Figs. 5 and 7 of the drawings, are employed to produce smaller pictures than that of the funnel, and in the case of the hood 28 after one exposure has been made the hood can be reversed to permit another negative-plate to be exposed, these two exposures occupying the same space as a picture that the funnel would have produced upon said negative-plate. The hood 31 can also be employed to produce a still smaller picture than the funnel or the hood 28, and this hood is so constructed that the same may be reversed to produce four pictures in the same amount of space as a picture that the funnel would have projected upon the sensitized negative.

While I have herein shown and described the funnel and the hoods as being preferably rectangular in cross-section, it will be noted that the same may be made circular in form or of any desired contour that may be used to obtain a reproduction of a desired shape, and other changes than these enumerated may be made without departing from the scope of the invention.

What I claim is—

1. An attachment for cameras, comprising a funnel, one end of said funnel being rectangular in form, a collar formed integral with the other end of said funnel, a hood adapted to fit over the end of said funnel, substantially as described.

2. An attachment for cameras comprising an adjustable lens-holding board, a funnel, an adjustable slide carried by one end of said funnel, a hood adapted to fit over said funnel.

3. An attachment for cameras comprising a funnel, one end of said funnel being formed rectangular, a collar formed integral with the other end of said funnel, an adjustable slide carried by said funnel, a hood, said hood having an opening formed therein.

4. In combination with a camera, a funnel, said funnel having a collar formed on its one end, and a rectangular opening formed in its other end, an adjustable slide mounted on said end, a hood, said hood having an opening formed therein.

5. In combination with a camera, a rotary and adjustable funnel mounted therein.

6. In combination with a camera, a funnel adapted to be mounted upon the end of the lens-holder, means for lengthening said funnel, substantially as described.

7. In combination with a camera, a funnel, means for lengthening said funnel, hoods adapted to be mounted on the end of said funnel, said hoods having openings formed therein.

8. In combination with a camera, a funnel adapted to be carried by the lens-holder, means for vertically and horizontally adjusting said funnel within said camera, means for lengthening said funnel, hoods adapted to be mounted upon the end of said funnel, said hoods having openings formed therein, substantially as described.

9. In a camera the combination with a casing and a lens-tube mounted on the front of the same and adjustable thereon in a vertical plane, of a funnel rotatably connected to the lens-tube, a bellows attached to said casing, an adjustable frame surrounding the bellows, and a frame slidably mounted in the adjustable frame and attached to said bellows.

In testimony whereof I affix my signature in the presence of two witnesses.

THOMAS MAHONEY.

Witnesses:
H. C. EVERT,
E. E. POTTER.